INVENTOR.
ELLIS V. BOYER
BY
Wm. H. Dean

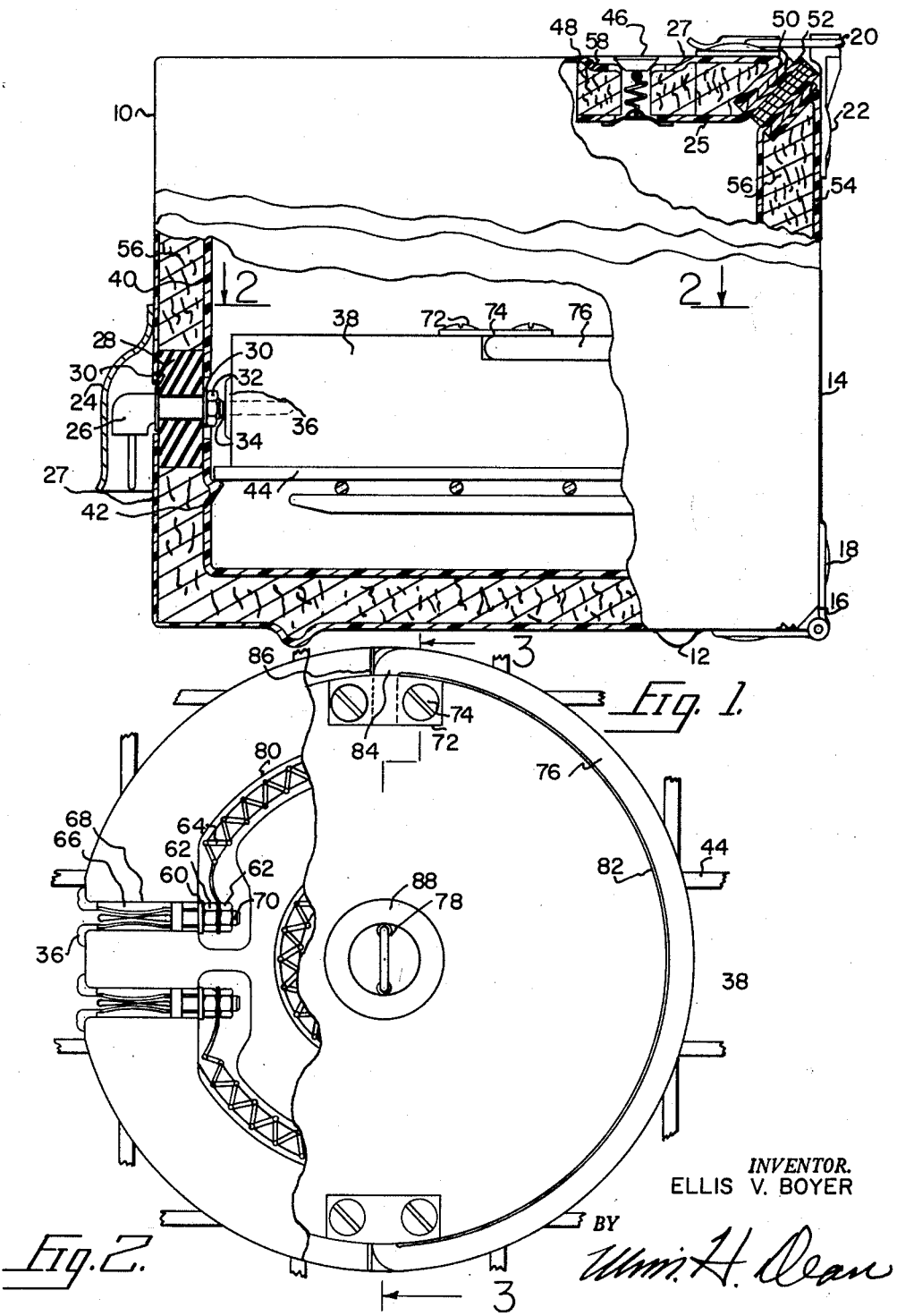
Dec. 22, 1964     E. V. BOYER     3,162,753
OVEN AND MEANS FOR HEATING THE INTERIOR THEREOF
Filed May 29, 1961     2 Sheets-Sheet 1
INVENTOR.
ELLIS V. BOYER Dec. 22, 1964   E. V. BOYER   3,162,753
OVEN AND MEANS FOR HEATING THE INTERIOR THEREOF
Filed May 29, 1961   2 Sheets-Sheet 2

United States Patent Office 3,162,753
Patented Dec. 22, 1964

3,162,753
OVEN AND MEANS FOR HEATING THE
INTERIOR THEREOF
Ellis V. Boyer, Phoenix, Ariz., assignor to
Sherrye Boyer, Phoenix, Ariz.
Filed May 29, 1961, Ser. No. 113,164
7 Claims. (Cl. 219—399)

This invention relates to an oven and means for heating the interior thereof, and more particularly, to an oven and means for heating the interior thereof having a removable heat retaining means heated by either an electrical heating element or by other heat sources such as campfires, when the heat retaining means is removed from the oven.

In the past, food cooking devices, similar to the present invention, have been very unsatisfactory. The insulating media used in the walls of cooking devices and the materials used in the construction of said walls have resulted in heat loss causing the cooking device to be impractical. Therefore, in many instances the loss of heat is so great that the cooking process could not be completed.

Accordingly, it is an object of the invention to provide a box-shaped cooking device which is light, portable, and can be used in various locations.

Another object of the invention is to provide construction and insulation materials with a low co-efficient of heat transfer, whereby, the heat retained will complete the cooking process.

Another object of the invention is to provide a dual means for providing heat to the interior of the cooking device.

A further object of the invention is to provide a means, whereby, the heat retaining member may be readily installed in the cooking device, after it has been heated by an external source.

An additional object of the invention is to provide an oven and means for heating the interior thereof, comprising a generally box-shaped insulated oven wherein a removable heat retaining member is disposed; said heat retaining member comprising a plurality of adjacent portions and electrical heating element therebetween, whereby the heat retaining member may be energized electrically internally of the oven or may be removed and placed on a campfire during which time the electrical heating element is fully protected in its position between the adjacent portions of the heat retaining member.

Another object of the invention is to provide an oven and means for heating the interior thereof, comprising a generally box-shaped insulated structure wherein a heat retaining member is disposed; said heat retaining member having a plurality of adjacent portions between which an electrical heating element is disposed whereby the electrical heating element, when energized, is enclosed and does not emit high temperature radiation to the inner walls of the oven or to other objects, such as food, internally of the oven.

Further objects and advantages of the invention may be apparent from the following specification, appended claims, and accompanying drawings, in which:

FIGURE 1 is a side elevational view of the food cooking device, in accordance with the present invention, and shows portions, thereof, fragmentarily and in section to amplify the illustration.

FIGURE 2 is a transverse sectional view taken from the line 2—2 of FIGURE 1;

Figure 3:
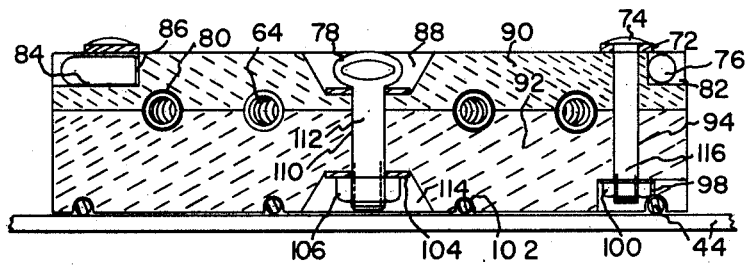
FIGURE 3 is a transverse sectional view taken from the line 3—3 of FIGURE 2.

The food cooking device, as disclosed in FIGURE 1 of the drawings, and according to the present invention, is a box-shaped oven 10 having an inner shell 25 and an outer shell 27. These inner and outer shells 25 and 27 are preferably made of resin impregnated glass fibers or other suitable thermal and electrical insulation material. The outer shell 27 is provided with feet or rails 12 for supporting the oven on a relatively flat surface. The oven 10 is provided with a front opening door 14, in one normally vertical side thereof. A plurality of hinges 16 and a plurality of fasteners 18 retain the hinges 16 in connection with the outer shell 27 of the oven 10 and connected to the outer shell 54 of the front opening door 14. The door 14 is retained in a closed position, with the oven 10, by means of a plurality of latches 20. The latches 20 are retained on the outer shell 27, of the oven 10, and outer shell 54, of the door 14, by a plurality of fasteners 22.

The construction of the junction between the door 14 and the remaining structure of the oven 10, presents a minimum of area through which internal heat may be conducted to the outside. The outer shell 27 is insulated from the inner shell 25 by means of an insulating gasket 50, which is retained in place by an adhesive. A similar heat insulating gasket 52 is located on the front edge of the inner shell 25 and there retained by an adhesive.

As may be seen in FIGURE 1 of the drawings, the door 14 is constructed in a similar manner.

The void between the outer shell 27 and the inner shell 25 of the oven 10, is filled with an insulating material 56, which in some cases, may be a volcanic ash containing minute bubbles of air. In some cases, it may be advisable, in order to improve the insulating qualities of the insulation 58, to draw a vacuum on this enclosed area. This vacuum may be within the range of one quarter of an inch and twelve inches of water.

On the outer shell 27, a shield 24 is mounted to protect an outside electrical connection 26 from damage. The electrical connection 26 is mounted through the outer shell 27 and the inner shell 25, of the oven 10, by means of an insulating block 28. This block 28 may be a transite type material, molded silicone rubber, or other suitable material.

The electrical connector 26 is maintained in a proper position to receive the external plug (not shown) by means of a washer 30 and a nut 32. A male portion 34, of the electrical connector 26, projected inside the oven 10, engages a mating electrical connector 36, carried by a heat retaining member 38. This heat retaining member is preferably made of soapstone or other equivalent material.

The heat retaining member 38 is located on a heavy wire grate 44, which is mounted on a plurality of lips 42 on the inner shell 25, of the oven 10.

The heat retaining member 38, of the present invention, carries the connector 36, which is adapted to receive the male connector 34, of the rigid fireproof stationarily mounted electrical connection 26. The connector 36 provides a female structure having a lateral serrated spring center section 66, which is of a diameter, whereby good electrical contact with the male portion 34, of the external electrical connection 26, is maintained. The female electrical connector 36 is mounted in a hole 68, in the heat retaining member 38, by means of a washer 60 and a nut 62, on a screw threaded portion 70, of the female electrical connector 36. A wire heating element 64 is connected to the threaded portion 70 of the female electrical connector 36, and secured in place by a nut 62 on the threaded portion 70, of the female electrical connector 36. The electrical heating element 64 is disposed in a groove or trough 80 in the top of a lower section 92, of the heat retaining member 38.

A handling ring 78 is located in a shallow hole 88, in the approximate center of an upper portion 90, of the heat retaining member 38. The screw threaded shaft 112 communicates through a hole 110 to a larger shallow hole 114 in the bottom of the lower portion 92, of the heat retaining member 38. The screw threaded shaft 112 receives a washer 104 and a screw threaded nut 106 and secures together the upper portion 90 and the lower portion 92, of the heat retaining member 38, thereby substantially enclosing the heating element 64. The enclosure of the heating element 64 prevents damage thereto when the heat retaining member is heated over a campfire. Additionally, the enclosure of the heating element 64, in the heat retaining member 38, prevents emission of high temperature radiation to the inner walls of the oven and also food therein.

A handling bale 76 is located in a groove 82 around the periphery of the upper portion 90, of the heat retaining member 38. The ends 84 of the handling bale 76 are located in radially disposed grooves 82 and are each held in place by a holding plate 72 and screws 74.

A screw threaded shaft 116, of each screw 74, communicates by means of hole 94 through the holding plate 72, the upper portion 90, and the lower portion 92, of the heat retaining member 38. A recessed hole 100, in the bottom of the lower portion 92, of the heat retaining member 38, receives the end of the screw threaded portion 116 of screw 74. Positioned on the threaded portion 116 is a washer 96 and a nut 98, which secure together the upper portion 90 and the lower portion 92 of the heat retaining member 38.

In the lower portion 92, of the heat retaining member 38, are grooves 102, which are parallel to the center line of the female electrical connector 36. These grooves 102 are engaged over longitudinal wires of the wire shelf 44 in a manner which guides the male portion 34 of the external electrical connection 26 into the female electrical connection 36.

A shallow depression 58, in the outer shell 27, houses the upper portion of a pressure-relief valve 46, which is mounted through the wall shells 25 and 27, by means of a molded ring 48.

The pressure-relief valve 46 communicates with the inside of the oven 10 through the inner shell 25 and the molded ring 48.

Figure 4:
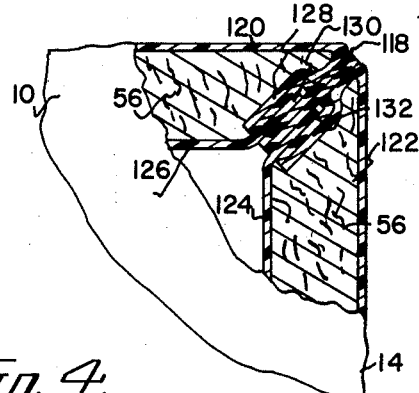
FIGURE 4 is an enlarged fragmentary sectional view of the corner construction, which is a modification of the corner construction shown in FIGURE 1.

The modification of the box-shaped oven, as shown in FIGURE 4 of the drawings, tends to reduce to an absolute minimum, the amount of heat which can be conducted from the inside of the box to the outside.

An outer shell 120 of the modified oven 10, comprises an offset flange 128, tending to reduce the amount of gasket material 118, which is required. A modified shell 122, of the front opening door 14, is offset in a similar manner. A flange 130 on an inner shell 126, of the box-shaped oven 10, is disposed to permit the gasket 118 to communicate on both sides of said flange. A flange 132, of an inner shell 124 of the door 14, has been modified in a similar manner.

The gasket 118 is interchangeable between the various shells 120 and 126, of the oven 10, and the shells 122 and 124, of the forward opening door 14. As may be seen, the insulating gasket 118, which may be made of silicone rubber, and having a low co-efficient of heat transfer would reduce to a minimum the amount of heat conducted from the inside shells to the outside surroundings.

In the use of the present food cooking device, when operated with electrical energy means, the heat retaining member 38 is plugged into the external electrical connection 26, by means of the male portion 34. The prepared foods are placed on a wire shelf, adjacent the heat retaining member 38. When water is required for cooking, a bare minimum, approximately a teaspoon, should be used.

The forward opening door 14 is closed and the latches 20 are locked. The electrical cord between the external connection 26 and the wall plug is energized. The electrical energy is converted into useful heat energy by the heating element 64, in the heat retaining member 38. The heat energy stored in the heat retaining member 38 is slowly radiated to the entire interior of the box-shaped oven 10. It has been found that, the application of electrical energy for more than five minutes is very seldom needed to create sufficient heat energy to prepare the foods in the oven 10. Any steam, which may be produced as a result of the cooking process, taking place inside the box-shaped oven 10, is relieved through the valve 46, thereby eliminating any possibility of over pressurizing the interior of the oven 10. After the cooking process has been completed, the latches 20 and the forward opening door 14 are opened and the cooked foods are removed and served.

If it is desired to operate the food cooking device in a location where electrical energy is not available, the following method may be used:

The heat retaining member 38 would be removed from the box-shaped cooking device 10, by the handling bale 76 or the handling ring 78. The heat retaining member 38 would then be placed on a source of heat energy, such as the coals of a campfire. After the heat retaining member 38 has been heated sufficiently, it is returned to the oven 10, by means of the handling bale 76 or the handling ring 78, in conjunction with other handling means not shown. The prepared foods are placed in the oven 10 and the forward opening door 14 closed and latches 20 are locked. When sufficient time has elapsed for the cooking processes to be completed, the food cooking device is opened and the food removed and served.

It will be obvious to those skilled in the art, that various modifications of the present invention may be resorted to in a manner limited only by the just interpretation of the following claims.

I claim:

1. In an oven and means for heating the interior thereof, the combination of: an oven enclosure having inner side walls; a soapstone heat retaining means comprising a plurality of adjacent portions removably disposed in said enclosure; a resistance heating element between said adjacent portions of said heat retaining means; electrical conductor means coupled to and insulated from said enclosure and extending from the exterior to the interior thereof; and male connector means projecting inwardly from the inner side wall of said enclosure; insulation means holding said male connector means rigidly and in fixed position; and female connector means adapted to receive said male connector means; said female connector means being wholly recessed in said heat retaining means and connected with said heating element therein, said male connector means being electrically connected to said electrical conductor means, said enclosure having an access opening therein and an access door movable relative thereto and providing access into said enclosure, said oven enclosure having said opening in a side wall thereof opposite to said inner side wall from which said male connectors project, said access door closing said opening in said opposite side wall, said access door operable to permit removal of said heating element axially of said male connector means and through said opening and to thereby permit removal of said heating element, said heat retaining member and concurrent disconnection of said heating element relative to said male connector means.

2. In an oven and means for heating the interior thereof, the combination of: an oven enclosure having inner side walls; a soapstone heat retaining means comprising a plurality of adjacent soapstone portions removably disposed in said enclosure; a resistance heating element between said adjacent portions of said heat retaining means; electrical conductor means coupled to and insulated from said enclosure and extending from the exterior to the interior thereof; and male connector means projecting inwardly from the inner side wall of said enclosure; insulation means holding said male connector means rigidly and in fixed position; and female connector means adapted to receive said male connector means; said female connector means being wholly recessed in said heat retaining means and connected with said heating element therein, said male connector means being electrically connected to said electrical conductor means, said enclosure having an access opening therein and an access door movable relative thereto and providing access into said enclosure; said oven enclosure having said opening in a side wall thereof which is opposite to said inner side wall from which said male connectors project, said access door closing said opening in said opposite side wall, said access door openable to permit removal of said heating element axially of said male connector means and through said opening and to thereby permit removal of said heating element, said heat retaining member and concurrent electrical disconnection of said heating element relative to said male connector means, said enclosure provided with inner and outer side walls; insulation between said inner and outer side walls; and gasket means of thermal insulating material disposed between said inner and outer walls to prevent the conduction of heat from the inner walls to the outer walls.

3. In an oven and means for heating the interior thereof, the combination of: an oven enclosure having inner side walls; a soapstone heat retaining means comprising a plurality of adjacent portions removably disposed in said enclosure; a resistance heating element between said adjacent portions of said heat retaining means; electrical conductor means coupled to and insulated from said enclosure and extending from the exterior to the interior thereof; and male connector means projecting inwardly from the inner side wall of said enclosure; insulation means holding said male connector means rigidly and in fixed position; and female connector means adapted to receive said male connector means, said female connector means being wholly recessed in said heat retaining means and connected with said heating element therein; said male connector means being electrically connected to said electrical conductor means, said enclosure having an access opening therein and an access door movable relative thereto and providing access into said enclosure; said oven enclosure having said opening in a side wall thereof which is opposite to said inner side wall from which said male connectors project, said access door closing said opening in said opposite side wall, said access door openable to permit removal of said heating element axially of said male connector means and through said opening and to thereby permit removal of said heating element, said heat retaining member and concurrent electrical disconnection of said heating element relative to said male connector means, said enclosure provided with inner and outer side walls; insulation between said inner and outer side walls; and gasket means of thermal insulating material disposed between said inner and outer walls to prevent the conduction of heat from the inner walls to the outer walls; and thermally insulating material between said door and the remaining structure of said enclosure to prevent the conduction of heat from the interior of said enclosure to the exterior thereof.

4. In an oven and means for heating the interior thereof, the combination of: an oven enclosure having inner side walls; a soapstone heat retaining means comprising a plurality of adjacent portions removably disposed in said enclosure; a resistance heating element between said adjacent portions of said heat retaining means; electrical conductor means coupled to and insulated from said enclosure and extending from the exterior to the interior thereof; and male connector means projecting inwardly from the inner side wall of said enclosure; insulation means holding said male connector means rigidly and in fixed position; and female connector means adapted to receive said male connector means; said female connector means being wholly recessed in said heat retaining means and connected with said heating element therein, said male connector means being electrically connected to said electrical conductor means, said enclosure having an access opening therein and an access door movable relative thereto and providing access into said enclosure; said oven enclosure having said opening in a side wall thereof which is opposite to said inner side wall from which said male connectors project, said access door closing said opening in said opposite side wall, said access door openable to permit removal of said heating element axially of said male connector means and through said opening and to thereby permit removal of said heating element, said heat retaining member and concurrent electrical disconnection of said heating element relative to said male connector means, said enclosure provided with inner and outer side walls; insulation between said inner and outer side walls; and gasket means of thermal insulating material disposed between said inner and outer walls to prevent the conduction of heat from the inner walls to the outer walls; and thermally insulating material between said door and the remaining structure of said enclosure to prevent the conduction of heat from the interior of said enclosure to the exterior thereof; said inner and outer walls of resin impregnated fiber glass electrical and thermal insulating materials.

5. In an oven and means for heating the interior thereof, the combination of: an oven enclosure having inner side walls; a soapstone heat retaining means comprising a plurality of adjacent portions removably disposed in said enclosure; a resistance heating element between said adjacent portions of said heat retaining means; electrical conductor means coupled to and insulated from said enclosure and extending from the exterior to the interior thereof; and male connector means projecting inwardly from the inner side wall of said enclosure; insulation means holding said male connector means rigidly and in fixed position; and female connector means adapted to receive said male connector means; said female connector means being wholly recessed in said heat retaining means and connected with said heating element therein, said male connector means being electrically connected to said electrical conductor means, said enclosure having an access opening therein and an access door movable relative thereto and providing access into said enclosure; said oven enclosure having said opening in a side wall thereof which is opposite to said inner side wall from which said male connectors project, said access door closing said opening in said opposite side wall, said access door openable to permit removal of said heating element axially of said male connector means and through said opening and to thereby permit removal of said heating element, said heat retaining member and concurrent electrical disconnection of said heating element relative to said male connector means, one of said adjacent portions of said heat retaining means being recessed to receive said resistance heating element whereby said adjacent portions may be substantially contiguous with each other; and means for holding said adjacent portions together for retaining said heating element therebetween.

6. In an oven and means for heating the interior thereof, the combination of: an oven enclosure having inner side walls; a soapstone heat retaining means comprising a plurality of adjacent portions removably disposed in said enclosure; a resistance heating element between said adjacent portions of said heat retaining means; electrical conductor means coupled to and insulated from said enclosure and extending from the exterior to the interior thereof; and male connector means projecting inwardly from the inner side wall of said enclosure; insulation means holding said male connector means rigidly and in fixed position; and female connector means adapted to receive said male connector means; said female connector means being wholly recessed in said heat retaining means and connected with said heating element therein, said male connector means being electrically connected to said electrical conductor means, said enclosure having an access opening therein and an access door movable relative thereto and providing access into said enclosure; said oven enclosure having said opening in a side wall thereof which is opposite to said inner side wall from which said male connectors project, said access door closing said opening in said opposite side wall, said access door openable to permit removal of said heating element axially of said male connector means and through said opening and to thereby permit removal of said heating element, said heat retaining member and concurrent electrical disconnection of said heating element relative to said male connector means, a rack above the bottom interior of said enclosure disposed to support said heat retaining member in alignment with said male connector means whereby said heat retaining member may be guided into a position by said rack for accurately connecting said female connector means and said male connector means to energize said resistant heating element in said heat retaining means.

7. In an oven and means for heating the interior thereof, the combination of: an enclosure having inner side walls; a soapstone heat retaining means comprising a plurality of adjacent soapstone portions removably disposed in said enclosure; a resistance heating element disposed between said adjacent portions of said heat retaining means; means holding said adjacent portions together for retaining said heating element therebetween; one of said soapstone portions disposed above said heating element and one of said soapstone portions disposed below said heating element; electrical conductor means coupled to and insulated from said enclosure and extending from the exterior to the interior thereof; male connector means projecting inwardly from the inner side wall of said enclosure; insulation means holding said male connector means rigidly and in fixed position; and female connector means adapted to receive said male connector means; said female connector means being wholly recessed in said heat retaining means and connected with said heating element therein, said male connector means being electrically connected to said electrical conductor means, said enclosure having an access opening therein; and an access door movable relative thereto and forming a part of said enclosure, said access opening being in a side wall of said enclosure opposite to said inner side wall from which said male connectors project, said access door closing said opening in said opposite side wall, said access door operable to permit removal of said heating element axially of said male connector means and through said opening and to thereby permit removal of said heating element, said heat retaining member and to permit concurrent disconnection of said heating element relative to said male connector means.

References Cited by the Examiner
UNITED STATES PATENTS

| | | | |
|---|---|---|---|
| 993,178 | 5/11 | Lamont | 219—402 |
| 997,467 | 7/11 | Nichols | 219—403 |
| 1,001,627 | 8/11 | Dunham | 219—391 |
| 1,027,739 | 5/12 | Lauzon | 219—403 |
| 1,034,268 | 7/12 | McCord | 126—400 |
| 1,065,148 | 6/13 | Lillibridge | 219—408 |
| 1,323,525 | 12/19 | Dutton | 219—431 |
| 1,396,105 | 11/21 | Garner | 338—252 |
| 1,661,464 | 3/28 | Campbell | 219—403 |
| 2,683,795 | 7/54 | Scheidler et al. | 219—395 |
| 3,024,344 | 3/62 | Dills | 219—413 |

RICHARD M. WOOD, *Primary Examiner.*

MAX L. LEVY, ANTHONY BARTIS, *Examiners.*